United States Patent
Yi et al.

(10) Patent No.: US 7,713,902 B2
(45) Date of Patent: May 11, 2010

(54) METHOD OF PREPARING A PLATINUM CATALYST FOR USE IN FUEL CELL ELECTRODE

(75) Inventors: Jongheop Yi, Seoul (KR); Pil Kim, Yeongju-si (KR); Heesoo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 314 days.

(21) Appl. No.: 11/295,312

(22) Filed: Dec. 5, 2005

(65) Prior Publication Data

US 2006/0142150 A1    Jun. 29, 2006

(30) Foreign Application Priority Data

Dec. 24, 2004   (KR) ............... 10-2004-0111689

(51) Int. Cl.
B01J 23/40    (2006.01)
B01J 23/74    (2006.01)

(52) U.S. Cl. .................. 502/185; 977/822; 977/823

(58) Field of Classification Search .......... 502/185; 977/822, 823
See application file for complete search history.

(56) References Cited

U.S. PATENT DOCUMENTS

| | | | | |
|---|---|---|---|---|
| 4,137,372 A | * | 1/1979 | Jalan et al. | 429/44 |
| 5,395,705 A | * | 3/1995 | Door et al. | 429/42 |
| 5,814,719 A | * | 9/1998 | Suzuki et al. | 73/23.31 |
| 6,129,901 A | * | 10/2000 | Moskovits et al. | 423/447.3 |
| 6,146,602 A | * | 11/2000 | Narula et al. | 423/213.5 |
| 6,992,039 B2 | * | 1/2006 | Jiang et al. | 502/327 |
| 2006/0194097 A1 | * | 8/2006 | Kim et al. | 429/44 |

FOREIGN PATENT DOCUMENTS

JP    2000-024517    *    1/2000

OTHER PUBLICATIONS

"Fabrication of a mesoporous Pt-carbon catalyst by the direct templating of mesoporous Pt-alumina for the methanol electro-oxidation," by Heesoo Kim et al. Journal of Power Sources 157 (2006), pp. 196-200; available online Sep. 1, 2005.*
"Mesoporous Alumina and Aluminosilica with Pd and Pt Nanoparticles: Structure and Catalytic Properties," Lyudmila M. Bronstein et al. Chem. Mater. 2003, 15, pp. 2623-2631.*
"Template Synthesis of Mesoporous Carbon Microfibers as a Catalyst Support for Methanol Electrooxidation," Fabing Su et al. Ind. Eng. Chem. Res. 2007, 46, pp. 9097-9102.*

* cited by examiner

*Primary Examiner*—Patricia L Hailey
(74) *Attorney, Agent, or Firm*—Morgan, Lewis & Bockius LLP (57) ABSTRACT

The present invention provides methods of preparing an improved platinum catalyst for use in fuel cells. The method includes preparing a platinum-loaded template of mesoporous alumina, and preparing a platinum catalyst using said alumina template. To prepare the template, a platinum solution and an aluminum alkoxide-butanol solution are combined to form a mixture and the mixture is then subjected to hydration and condensation reactions. To prepare the platinum catalyst, the template and carbon precursors are subjected to polymerization, and the resultant composite subjected to heat treatment. Due to the uniform platinum particle size and high specific surface area achieved, the method of the invention can produce a platinum catalyst with high catalytic activity and thermal stability and in turn improve the performance of the fuel cell in which the catalyst is used.

8 Claims, 10 Drawing Sheets

METHOD OF PREPARING A PLATINUM CATALYST FOR USE IN FUEL CELL ELECTRODE

CROSS REFERENCE TO RELATED APPLICATION

This application claims priority of Korean Patent Application No. 10-2004-0111689, filed Dec. 24, 2004 with the Korean Intellectual Property Office, the disclosure of which is fully incorporated herein by reference.

BACKGROUND OF THE INVENTION

1. Field of the Invention

The present invention relates to a method of preparing a platinum catalyst. More specifically, the present invention relates to a method of preparing an improved platinum catalyst for use in fuel cell electrodes.

2. Description of the Related Art

Spurred on by increasing oil prices and growing concerns over environmental pollution, the use of fuel cells has sparked global interest as an alternative to fossil fuel and combustion technologies. Fuel cells are attractive for a number of reasons, e.g. low pollution, high energy efficiency, fuel flexibility, high quality power output, quick response to load fluctuations, excellent heat recovery characteristics, quiet operation, etc. Their high energy efficiency and low pollution partly derive from the use of a clean fuel source, e.g. hydrogen, methanol, etc.

Platinum catalysts are often employed in fuel cell electrodes since they can increase the fuel cell's power density. However, the amount of natural platinum deposits is in limited supply, and its use in fuel cell electrodes quite cost-prohibitive. Accordingly, efforts are being made toward developing a catalyst for fuel cell electrode, which uses a lower quantity of platinum yet retains relatively high energy efficiency as compared to the conventional fuel cell electrode catalyst.

The conventional platinum catalyst used in fuel cell electrode requires a high quantity of platinum to be loaded on carbon supports. Typically, 20 weight parts of platinum particles are loaded on 100 weight parts of carbon supports. However, when too much platinum is loaded onto carbon supports, the platinum particles tend to agglomerate and form larger particles. This in turn reduces the specific surface area of the catalyst and lowers the overall catalytic activity. In other words, a catalyst with larger platinum particles has lower catalytic activity than a catalyst with smaller particles even when the amount of platinum deposited and amount of carbon supports are held constant. Catalyst supports that are currently in commercial use have a relatively high average specific surface area, e.g. 250 $m^2/g$. In conventional catalysts, about 20 weight parts of platinum can be uniformly dispersed on 100 weight parts of carbon supports. However, agglomeration of platinum particles results when more than 20 weight parts of platinum particles are loaded onto 100 weight parts of supports.

One attempt to solve the agglomeration problem described above is found in Korean Unexamined Patent Publication No. 2002-84372, which proposes using a mesoporous carbon substance with high specific surface area as a catalyst support. This substance can prevent platinum particles from agglomerating by enabling a large number of platinum particles to be uniformly dispersed on its surface, so as to form a catalyst with higher catalytic activity for applications in fuel cell electrodes.

To form this mesoporous carbon substance, carbon precursors such as carbohydrate or carbon polymer precursors are forced to permeate into pores of a silica template, i.e. a structure with uniformly-sized pores. The silica template, having been impregnated with carbon precursors, is dried and polymerized using an acid catalyst. The resultant composite is then subjected to a high temperature for thermal decomposition to yield a silica-carbon composite. The silica template is removed from said composite using either a strong base, e.g. sodium hydroxide (NaOH), or a strong acid, e.g. hydrofluoric acid (HF). The resultant structure is then rinsed with ethanol and water and filtered to produce a mesoporous carbon substance with large uniformly-sized pores. The final steps in preparing a platinum catalyst for applications in fuel cell electrodes involve treating the surface of the mesoporous carbon and loading small uniformly-sized platinum particles thereupon.

While the mesoporous carbon substance of the prior art can support a high quantity of platinum, its preparation and use in fuel cell electrodes present several problems. For instance, the pores of the platinum catalyst as prepared by the conventional method become clogged during the platinum loading step. This can lower catalytic activity, which in turn detracts from fuel cell performance. In addition, the conventional method of preparing a platinum catalyst lacks a high temperature thermal treatment step, causing sintering, i.e. agglomeration of metal particles on the catalyst, to occur as a result of exposure to heat generated during fuel cell operation. The many labor-intensive steps and long processing time are additional disadvantages associated with the conventional method of preparing a platinum catalyst using the mesoporous carbon substance. In light of the above, there is a need in the art to overcome these problems associated with preparation of a platinum catalyst for use in fuel cell electrode.

SUMMARY OF THE INVENTION

The present invention relates to methods of preparing an improved platinum catalyst with uniformly-sized platinum particles and high specific surface area. Using a platinum-loaded template of mesoporous alumina, the present method allows an excess of 20 weight parts of platinum to be deposited onto 100 weight parts of catalyst supports. When applied to fuel cell electrode, the method of the invention can produce an improved platinum catalyst that can increase the power density, output voltage, and thermal stability of the fuel cell.

It is an object of the present invention to provide a method or methods of preparing a platinum catalyst for a fuel cell electrode using a platinum-loaded template of mesoporous alumina.

According to one aspect of the present invention, the method of preparing a platinum catalyst for a fuel cell electrode comprises preparing a platinum loaded template of mesoporous alumina and preparing a platinum catalyst using said mesoporous alumina template.

According to another aspect of the present invention, the method of preparing an improved platinum catalyst for a fuel cell electrode comprises preparing a platinum-loaded template of mesoporous alumina and preparing a platinum catalyst using said template. To prepare the template, a platinum solution and an aluminum alkoxide-butanol solution are combined to form a mixture and the mixture is then subjected to hydration and condensation reactions. To prepare the platinum catalyst, the template and carbon precursors are subjected to polymerization, and the resultant composite subjected to heat treatment. Due to the uniform platinum particle size and high specific surface area achieved, the method of the invention can produce a platinum catalyst with high catalytic activity and in turn improve the performance of the fuel cell in which the catalyst is used.

DETAILED DESCRIPTION OF THE PREFERRED EMBODIMENTS

An exemplary method of preparing a platinum catalyst for a fuel cell electrode according to the present invention comprises two major steps: I) preparing a platinum-loaded template of mesoporous alumina and II) preparing a platinum catalyst using the template. Each major step involves one of more sub-steps, which will be explained in detail below with reference to the accompanying drawings.

I. Preparation of a Platinum-Loaded Template of Mesoporous Alumina

An alumina template prepared by sub-steps (1) through (5) below has a specific surface area from 100 to 450 $m^2/g$ so as to provide a large surface for uniform dispersion of fine platinum particles thereupon such that agglomeration can be minimized and/or avoided. As another advantage, since the pore size of the alumina template is uniformly distributed in the range of 2 to 5 nanometers, carbon precursors can permeate into pores of the alumina template more easily than with the micropores of conventional catalyst supports. The present invention also allows the quantity of platinum that can be loaded onto 100 weight parts of alumina to be controlled in the range of 0.5 to 35 weight parts. The total quantity of platinum to be supported on 100 weight parts of mesoporous carbon supports in the catalyst can therefore be controlled in the range of 1.5 to 95 weight parts, as will be explained in detail in the following disclosure.

Additionally, the method of the present invention achieves significant savings in time, labor, and resources. Since the alumina template of the present invention already contains platinum particles, the surface treatment and platinum impregnation steps needed with conventional mesoporous carbon templates can be forgone. The sintering problem associated with conventional platinum catalysts is also cured by the method of the invention, which involves a high temperature carbonization procedure as platinum particles are loaded during the template preparation. A platinum catalyst with improved thermal stability is thereby produced.

(1) Preparation of a Platinum Solution

In one embodiment of the present invention, a carboxylic acid of choice acting as a chemical framework is dissolved together with platinum precursors in butanol. Once combined, the carboxylic acid and platinum precursors form micelles in butanol by self-assembly. As used herein, the term "carboxylic acid" is any chemical with a carboxy group. The carboxylic acid may be branched or linear. Preferably, the carboxylic acid molecule contains 6 to 18 carbons. More preferably, the carboxylic acid is selected from one of the group comprising caproic acid ($C_6$), lauric acid ($C_{12}$) and stearic acid ($C_{18}$).

According to one embodiment of the invention, the quantity of the carboxylic acid used can range from 5 to 30 weight parts per 100 weight parts of alumina precursors. An excess of 30 weight parts of carboxylic acid per 100 weight parts of alumina precursors can cause the mesoporous characteristic of the alumina to decline. Using less than 5 weight parts of carboxylic acid, however, can result in insufficient pores in the alumina. The amount of carboxylic acid to be used can be varied accordingly by one of skill in the art.

The solution obtained from dissolution of the carboxylic acid and platinum precursors in butanol has a pH ranging from 1 to 5. As will be later explained in step (3), this pH is significant in that it may affect the degree and rate of condensation of alumina.

In an alternative embodiment, a mesoporous alumina copolymerized with a platinum-metal alloy can be prepared, in which the metal is selected from one of the group comprising iron, cobalt and chrome. Preferably, the concentration of metal content in the alloy ranges from 15 to 85 atom percentage.

(2) Preparation of an Aluminum Alkoxide-Butanol Solution

In this step, aluminum precursors, e.g. aluminum alkoxide, is dissolved in butanol to produce an aluminum alkoxide-butanol solution. This step is performed in parallel with step (1) in that it neither uses the product(s) of step (1) nor are its product(s) channeled for use in step (1). As aluminum alkoxide readily solidifies in the presence of moisture in the air, the butanol is used essentially as a moisture barrier to prevent the aluminum alkoxide from reacting with moisture and from solidifying.

(3) Preparation of a Mixed Solution

Figure 1:
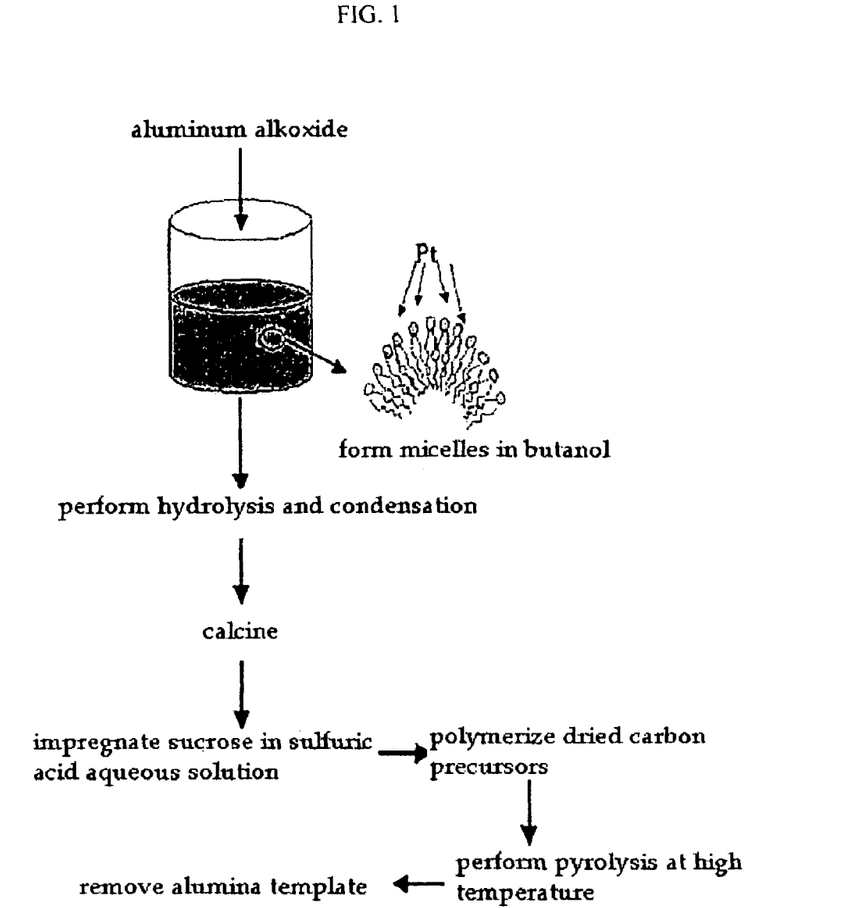
FIG. 1 is a flow diagram showing a method of preparing a platinum catalyst, in accordance with the present invention.
Figure 2A:
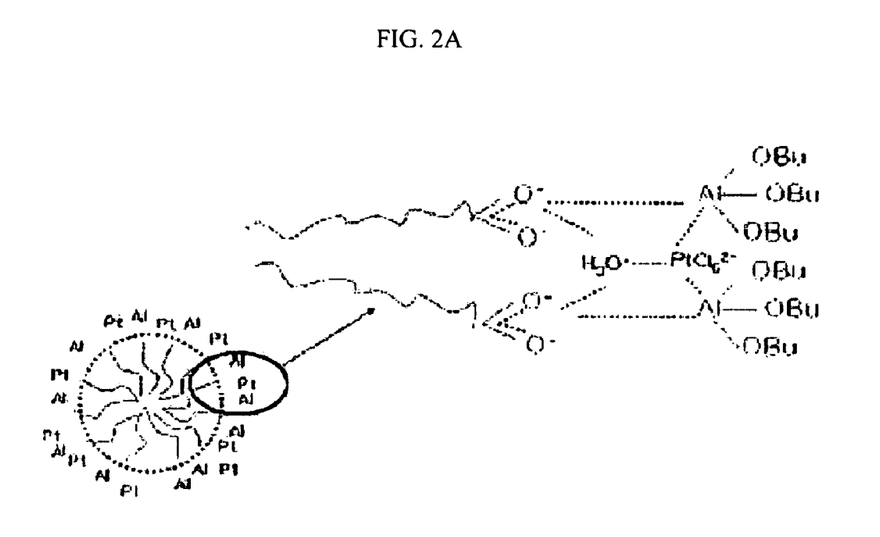
FIG. 2A is a representation of micelle formation and interaction among lauric acid, platinum ions and aluminum alkoxide ions.
Figure 2B:
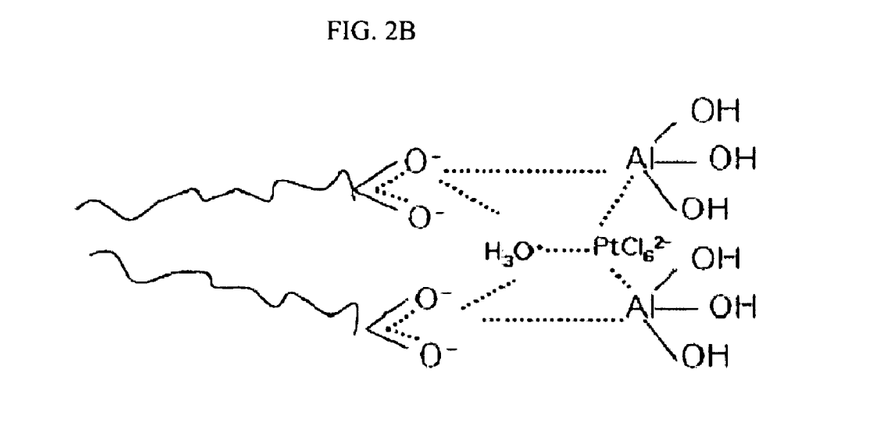
FIG. 2B is a representation of a lauric acid-platinum ion-aluminum alkoxide composite after hydration.
Figure 2C:
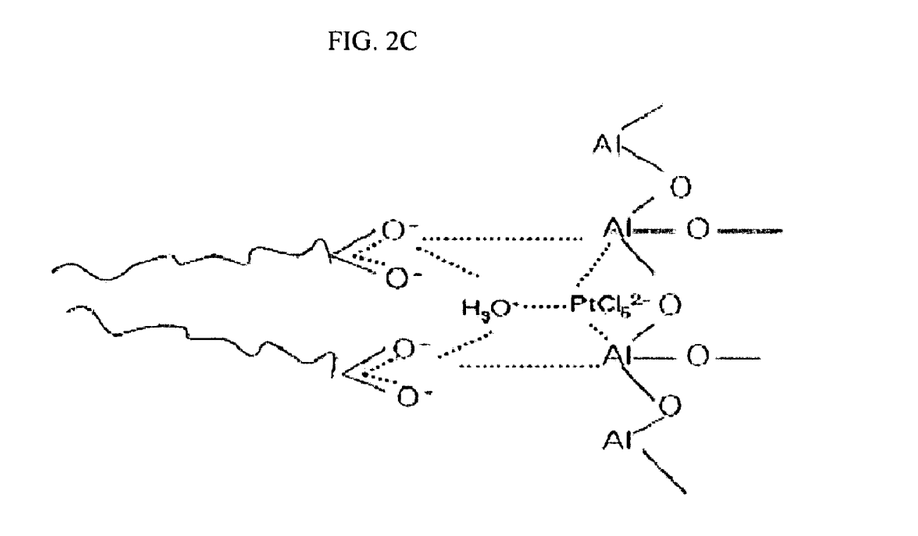
FIG. 2C is a representation of a lauric acid-platinum ion-aluminum alkoxide composite after condensation, which follows hydration in the method of the invention.

In this step, the platinum solution of step (1) is mixed with the aluminum alkoxide-butanol solution of step (2). The platinum solution and the aluminum alkoxide-butanol solution should be well-stirred, so as to allow the carboxylic acid, platinum ions, and aluminum alkoxide to interact in the butanol solution and thereby produce micelles. (See FIG. 2A to FIG. 2C).

(4) Hydrolysis of the Mixed Solution

Water is added gradually to the mixed solution of step (3) to effectuate hydrolysis and condensation of said solution. The aluminum alkoxide rapidly undergoes hydration due to the gradual pouring of water to form aluminum hydroxide and interacts with the carboxylic acid and platinum ions to form a composite. Condensation of the aluminum alkoxide also occurs in the course of hydrolysis. Preferably, the flow rate of the water used is selected from 0.1 to 5 ml/min. Too slow a flow rate would unnecessarily increase the time it takes to complete the process. Too high a flow rate, though allowing for the condensation of aluminum alkoxide, would cause the mesoporous characteristic of the final product, i.e. the alumina template, to deteriorate. (See FIG. 2A to FIG. 2C). The appropriate flow rate to use will depend on a variety of factors and can be readily determined by one of skill in the art.

(5) Mixing, Drying and Calcining

To effectuate crosslinking in the aluminum composite produced by step (4), the composite is mixed for a minimum of 20 h., dried for 5 to 48 h., then calcined in air or in an inert gas ambient for 3 to 5 h. Preferably, the composite is dried at room temperature or above. More preferably, the composite is dried at a temperature ranging from 40° C. to 120° C. With respect to the calcining process, the composite is preferably calcined at a temperature ranging from 400 to 700° C. After calcining, the micelles are removed, thereby producing a mesoporous alumina template that is loaded with platinum.

II. Preparation of Platinum Catalyst Using Mesoporous Alumina Template Loaded with Platinum (1) Preparation of an Organic-Inorganic Composite Wherein a Template and Carbon Precursors are Combined In this step, carbon precursors are forced to permeate into pores of the platinum-loaded template of mesoporous alumina from step (5) and the resulting composite undergo polymerization to form an organic-inorganic composite, i.e. a carbon-containing mesoporous alumina composite loaded with platinum. Preferably, the ratio of the volume of carbon precursors used to permeate into the template produced in step I(5) to the net pore volume of the template ranges from about 0.8 to 1.5.

It should be noted that if too few carbon precursors are used, the catalyst supports thereby produced would have misshapened pores. On the other hand, using an amount in excess of the predetermined range, i.e. carbon precursor volume to net template pore volume ratio of 0.8 to 1.5, results in non-uniform pore size distribution in the carbon substance thereby produced.

Preferably, the carbon precursor(s) used is selected from one or more of the group comprising sucrose, divinylbenzene (DVB), aniline, pyrrole, acrylonitrile, acetylene, propylene. Carbohydrates such as sucrose can be polymerized using acid catalyst, e.g. sulfuric acid. It should be noted that carbon precursors such as DVB and acrylonitrile would require additional polymerization initiator such as AIBN (Azobisisobutyronitrile) to be used.

(2) Pyrolysis of the Organic-Inorganic Composite

The polymerized organic-inorganic composite produced in step II(1) is then heated at 800° C. or higher in a nitrogen or anoxic ambient for thermal decomposition. This step can effectuate the removal of impurities from the organic-inorganic composite, i.e. components other than carbon, alumina, and platinum. While pyrolysis can be performed at temperatures up to 2000° C., it is preferably performed at temperatures of 1300° C. or below.

If the pyrolysis temperature chosen is too low, insufficient carbonization would occur, resulting in a catalyst with low conductivity and low specific surface area. Since the process of the present invention subjects platinum-loaded alumina to pyrolysis at high temperatures, the sintering problem and requirement for relatively high calcination temperatures typically associated with conventional platinum catalysts are avoided.

(3) Removal of Alumina Templates from the Organic-Inorganic Composites

The resultant structure obtained after pyrolysis is reacted with a strong acid, e.g. hydrofluoric acid (HF), or a strong base, e.g. sodium hydroxide (NaOH), to remove the alumina template. Alumina templates are removed through the following reactions as represented by their respective chemical equations.

$Al_2O_3$ (solid)+$6H_3O^+$ (liquid ions)+$3H_2O$ (liquid)→2 $[Al(OH_2)_6]^{3+}$+ (liquid ions) <Reaction 1>

$Al_2O_3$ (solid)+$2OH^-$ (liquid ions)+$3H_2O$ (liquid)→2 $[Al(OH_2)_4]^-$ (liquid ions) <Reaction 2>

The template removal process is repeated several times. After completing the template removal, the resultant structures are filtrated to thereby produce platinum catalyst(s).

Preferred embodiments of the present invention are provided below to further illustrate the present invention and should not be construed to limit the invention. Those of skill in the art will readily recognize a variety of non-critical parameters that could be changed or modified to yield essentially similar results.

Embodiment 1

Preparation of Mesoporous Alumina Loaded with Platinum

First, a platinum solution is prepared by dissolving 2.0 g of lauric acid serving as a chemical framework and 0.236 g of hexachloroplatinic acid into 23 ml of butanol.

Separately, an aluminum alkoxide-butanol solution is prepared by dissolving 6.16 g of aluminum alkoxide in 23 ml of butanol. The platinum solution and the aluminum alkoxide-butanol solution are gradually mixed to obtain a mixed solution. Next, 12 ml of water ($H_2O$) is added to the mixed solution at a flow rate of 0.1 ml/min to cause the mixed solution to undergo hydrolysis and condensation. Reaction products obtained after hydrolysis and condensation are dried and calcined in the air or in nitrogen ambient at 450° C. for 5 h., thereby removing the lauric acid that previously served as the chemical framework.

Embodiment 2

Preparation of Platinum Catalyst from Platinum-Copolymerized Aluminum Template

The platinum-loaded template of mesoporous alumina is impregnated with a solution of 1 g of alumina, 1.2 g of sucrose, 2.5 ml of water and 0.05 ml of sulfuric acid. During the impregnation, the sucrose is completely dissolved in the sulfuric acid, and the sulfuric acid acts as an acid catalyst for polymerization of the sucrose. After impregnation, the resultant composite is dried at 100° C. for 8 h. and polymerized at 180° C. for 6 h. The steps described above are repeated once more. After the completion of the impregnation and polymerization steps, a hard and dark brown solid is produced. The solid is pulverized to be powder and the powder is thermally decomposed in nitrogen ambient at 800° C. for 6 h.

Since the alumina template remains after thermal decomposition, the thermally decomposed powder is dipped into hydrofluoric acid (HF) or sodium hydroxide (NaOH) (3M) for 12 h, rinsed, filtered and dried at 80° C. to completely remove the alumina template. The dipping, rinsing, filtering, and drying are repeated 3 times to remove all or nearly all remnants of the alumina template.

The following examples are provided by way of illustration only and not by way of limitation. Those of skill in the art will readily recognize a variety of non-critical parameters that could be changed or modified to yield essentially similar results.

EXAMPLES

Example 1

Figure 3A:
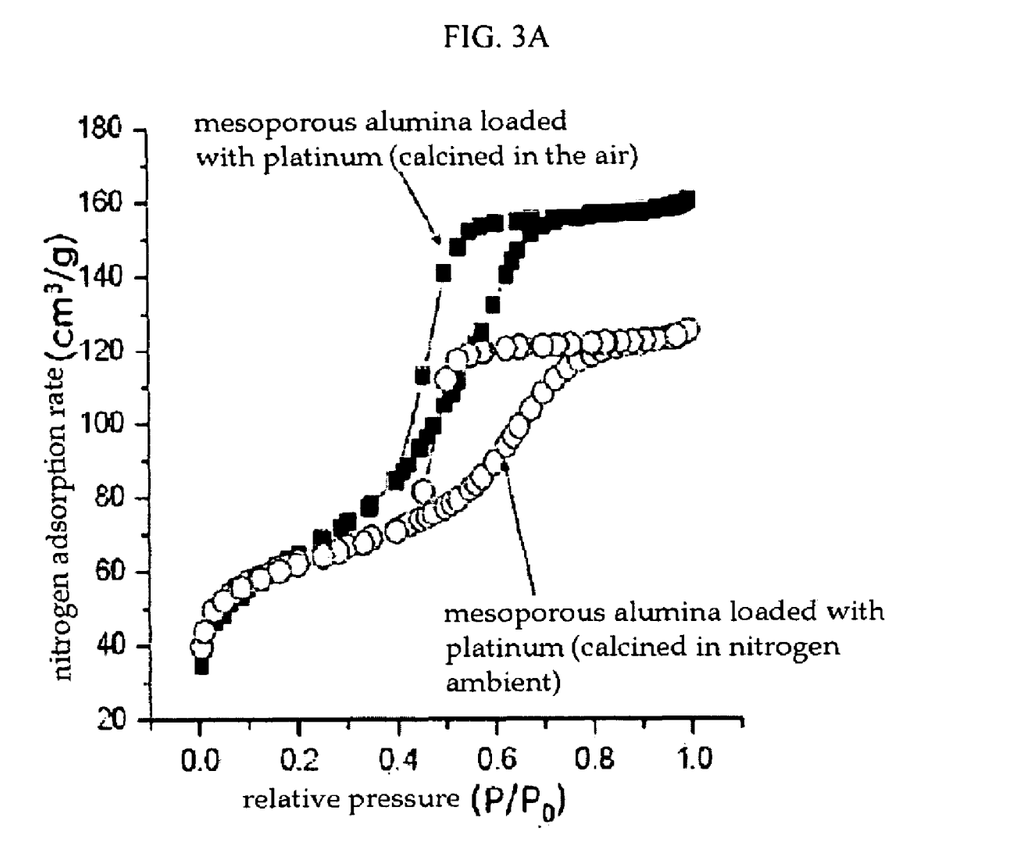
FIG. 3A is a graph of the nitrogen adsorption-desorption rates at different pressures of platinum-loaded mesoporous alumina.
Figure 3B:
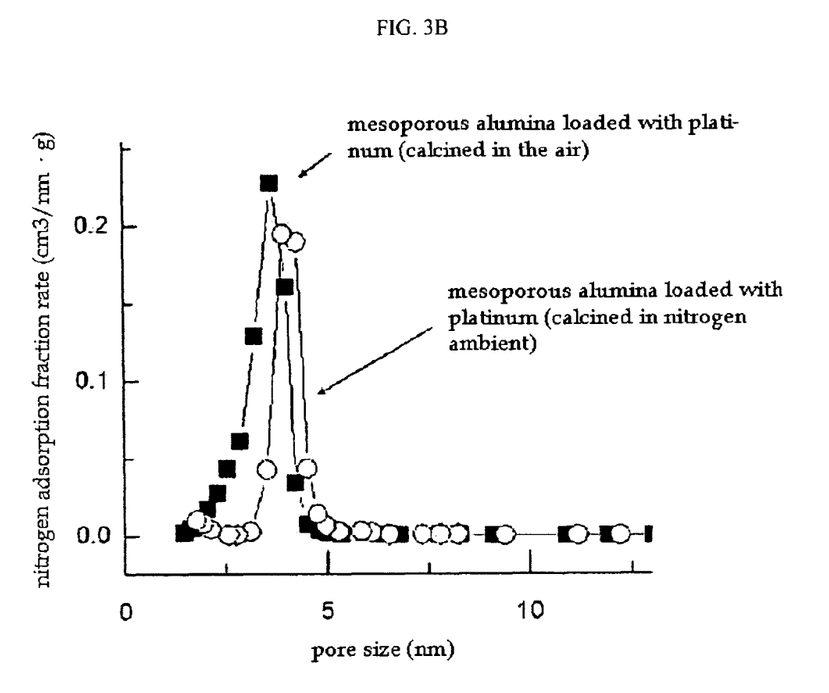
FIG. 3B is a graph of the pore size distribution of platinum-loaded mesoporous alumina.
Figure 3C:
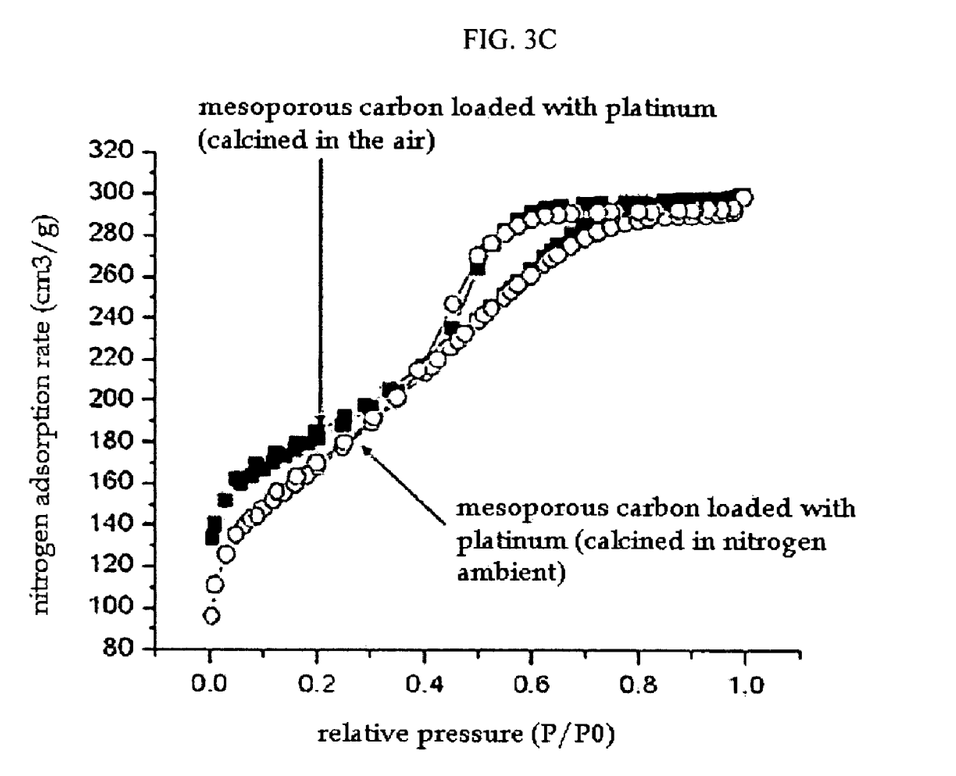
FIG. 3C is a graph of the nitrogen adsorption-desorption rates at different pressures of the platinum catalyst for use in a fuel cell electrode according to the present invention.
Figure 3D:
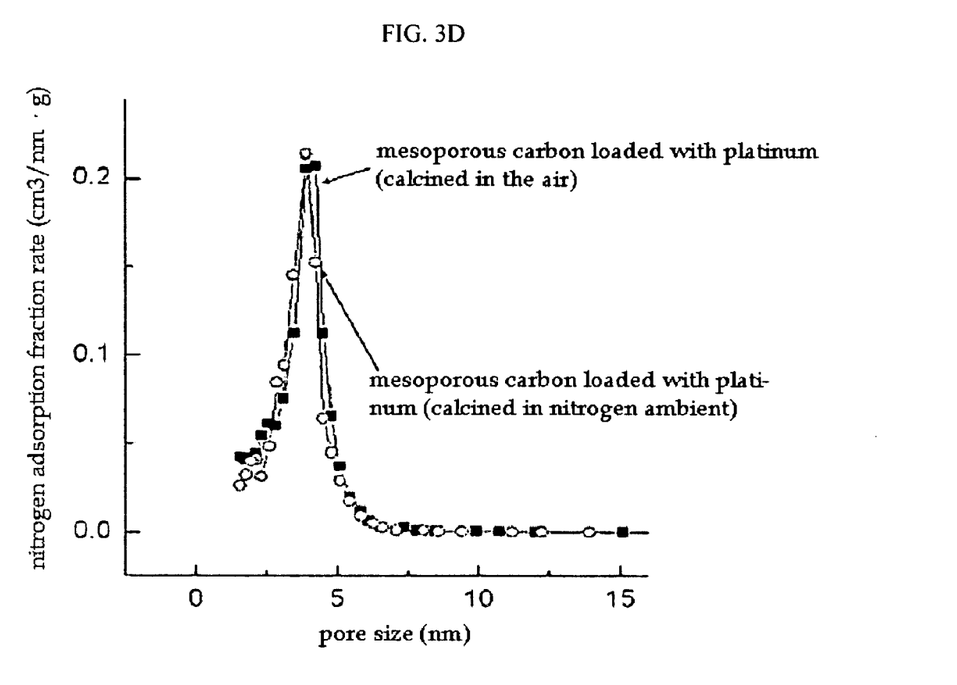
FIG. 3D is a graph showing the pore size distribution of the platinum catalyst for use in a fuel cell electrode according to the present invention.
Figure 4A:
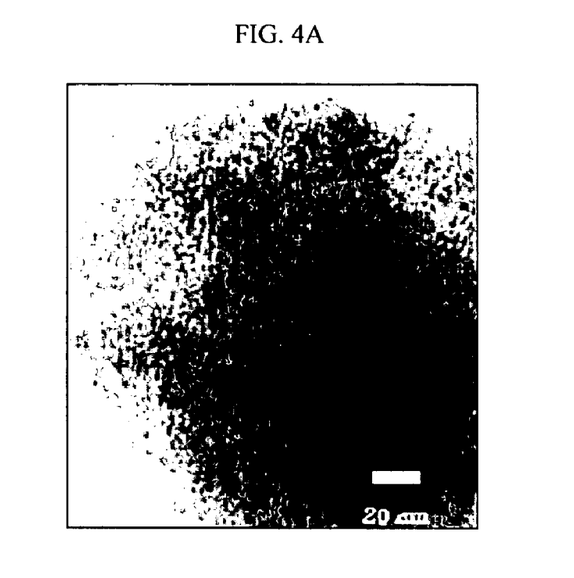
FIG. 4A shows a Transmission Electron Microscopy (TEM) image of platinum-loaded mesoporous alumina when calcined in the air.
Figure 4B:
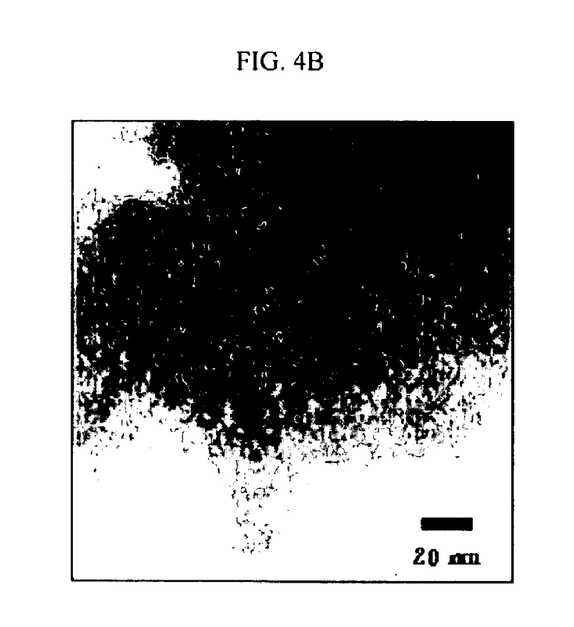
FIG. 4B shows a Transmission Electron Microscopy (TEM) image of platinum-loaded mesoporous alumina when calcined in nitrogen ambient.
Figure 5A:
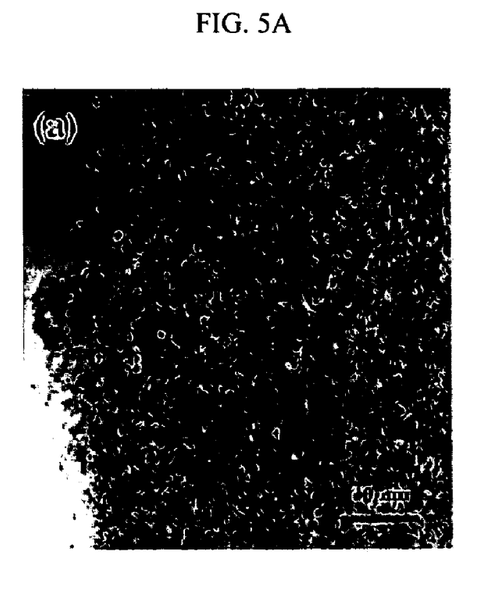
FIG. 5A shows a TEM image of a platinum catalyst for a fuel cell electrode according to the present invention when calcined in the air.
Figure 5B:
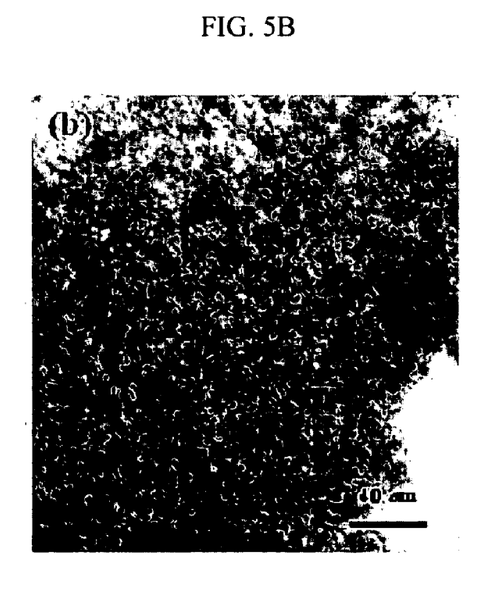
FIG. 5B shows a TEM image of a platinum catalyst for a fuel cell electrode according to the present invention when calcined in nitrogen ambient.
Figure 6:
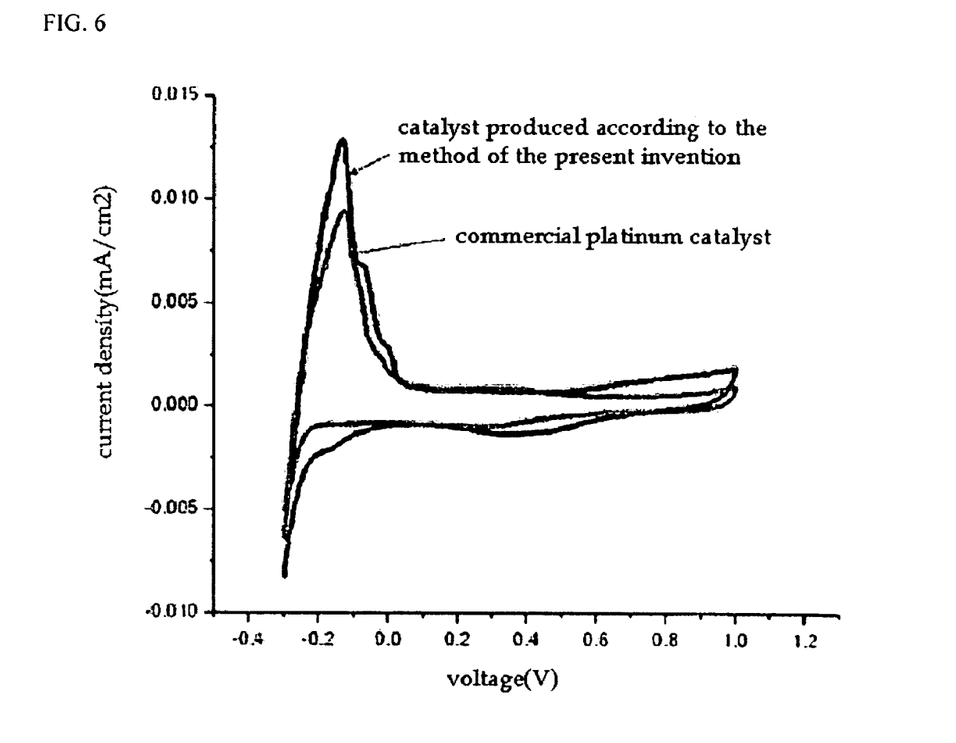
FIG. 6 shows characteristics of the platinum catalyst according to the present invention with respect to current density as compared with that of the conventional platinum catalyst (E-tek).

Measurement of Surface Area and Pore Size of Mesoporous Alumina Loaded with Platinum A nitrogen adsorption-desorption experiment was performed in 77K nitrogen ambient to observe characteristics of the mesoporous alumina pores. Using the Brunauer-Emmett-Teller (BET) equation, the surface area of the mesoporous alumina was calculated to be in the range of 200 to 250 m$^2$/g. The adsorption-desorption isotherms obtained in this experiment correspond to type IV of the International Union of Pure and Applied Chemistry (IUPAC) standard, and the pores formed were distributed according to a hysteresis curve at relative pressures of 0.4 to 0.6 P/P0. Analysis of the hysirisis curve shows that pore sizes were more uniform at points where the full width at half maximum (FWHM) of the hysteresis curve is narrow. (See FIG. 3A through FIG. 3C)

Example 2

Nitrogen Adsorption-Desorption for Platinum Catalyst

This example follows from the procedure used in Example 1. As demonstrated in FIG. 3A through FIG. 3C, the platinum catalyst for a fuel cell electrode had pores similar to those of the mesoporous alumina loaded with platinum; the pore sizes were about 4 nanometers in diameter and substantially uniform. Based on this experiment, the specific surface area of the platinum catalyst was shown to about 600 to 620 m$^2$/g.

Example 3

Comparative TEM Images of Platinum-Loaded Tem Mesoporous Alumina and Platinum Catalyst Referring to FIG. 4A, 4B and FIG. 5A, 5B, platinum particles deposited on mesoporous alumina were 1 to 2 nanometers in diameter and substantially uniform in size. The platinum particles found in the platinum catalyst for a fuel cell electrode as produced by the method of the present invention were also uniformly-sized, ranging from 1 to 2.4 nanometers in diameter.

Example 4

Comparison of Catalytic Activities Between the Platinum Catalyst Produced by the Method of the Present Invention and a Convention Platinum Catalyst Catalytic activities of the platinum catalyst produced in accordance with the present invention and E-tek, an exemplary conventional catalyst, are compared with respect to their degrees of dispersion. To measure the degree of dispersion of the catalysts, each of them were separately dispersed in electrolyte aqueous solutions containing 0.5M sulfuric acid, and current change was detected by applying a predetermined voltage to the electrolytes at regular intervals. The degree of dispersion of catalyst can be determined by Mathematical Equation 1 below.

$$S_{electro}=(Q/vcL_{Pt})*100 \qquad \text{Mathematical Equation 1}$$

Here, $S_{electro}$ denotes a value of degree of dispersion of catalyst, and Q is the quantity of electric charge. Further, v is the voltage (mv/sec) applied to the electrolyte solution, c is a constant used for calculation when catalyst is practically dispersed on a fuel cell electrode, and $L_{Pt}$ is the amount of platinum deposited on catalyst supports in the catalyst.

The degree of dispersion of a catalyst is proportional to the value of S which can be determined from the graph in FIG. 5. Comparison of the degree of dispersion between a catalyst produced by the method of the present invention and E-tek are shown in FIG. 5. The catalyst made according to the present invention has an S value of 107.5 m$^2$/g while the conventional catalyst has an S value of 92.7 m$^2$/g. In this example, the platinum catalyst made according to the present invention has a greater S value than the commercial catalyst by about 15%. This goes to support the fact that the catalyst made according to the present invention has higher catalytic activity than the conventional catalyst as represented by E-tek.

In summary, the method of preparing a platinum catalyst for a fuel cell electrode according to the method of the present invention comprises (a) preparing a platinum-loaded template of mesoporous alumina by hydrating and condensing a mixed solution of a platinum solution and an aluminum alkoxide-butanol solution, and (b) preparing a platinum catalyst by polymerizing carbon precursors with the template and subjecting the composite to heat treatment. Due to uniform platinum particle size and a high specific surface area, the platinum catalyst produced by the present invention has excellent catalytic activity even when an excess of 20 weight parts of platinum are loaded onto 100 weight parts of supports.

Since the platinum-loaded template of mesoporous alumina has a large specific surface area ranging from 100 to 450 m$^2$/g, it provides ample room for the uniform dispersion of many fine platinum particles. As another advantage, since the pore size of the alumina template is uniformly distributed in the range of 2 to 5 nanometers, carbon precursors can permeate into pores of the alumina template more easily than with the micropores of conventional catalyst supports.

Additionally, the method of the present invention is more cost-effective than methods of the prior art. Since the alumina template of the present invention already contains platinum particles, the surface treatment and platinum impregnation steps needed with conventional mesoporous carbon templates can be forgone. The sintering problem associated with conventional platinum catalysts is also solved by the method of the invention, which produces a platinum catalyst with superior thermal stability through a carbonization process.

Those skilled in the art will appreciate that the conceptions and specific embodiments disclosed in the foregoing description may be readily utilized as a basis for modifying or designing other embodiments for carrying out the same purposes of the present invention.

What is claimed is:

1. A method of preparing a platinum catalyst for a fuel cell electrode, comprising:
    preparing a platinum-loaded template of mesoporous alumina; and
    preparing a platinum catalyst using the alumina template, said catalyst having mesoporous carbon supports therein,
    wherein preparing the template comprises:
    preparing a platinum solution by dissolving platinum precursors and a carboxylic acid in a first butanol solution;
    preparing an aluminum alkoxide solution by dissolving aluminum precursors in another butanol solution;
    preparing a mixed solution by mixing the platinum solution and the aluminum alkoxide solution; and
    subjecting the mixed solution to condensation through the addition of water to the mixed solution.

2. The method of claim 1, wherein preparing the catalyst comprises:
    a) manufacturing an organic-inorganic composite by impregnating pores of the platinum-loaded template of mesoporous alumina with carbon precursors;
    b) subjecting the organic-inorganic composite to pyrolysis; and
    c) removing alumina from the composite produced in step b) using a strong acid or a strong base.

3. The method of claim 2, wherein ratio of the volume of carbon precursors used to the net pore volume of the template ranges from 0.8 to 1.5.

4. The method of claim 2, wherein pyrolysis is performed at temperatures in the range of 800° C. to 1300° C.

5. The method of claim 1, wherein the carboxylic acid is made up of 6 to 18 carbon molecules.

6. The method of claim 1, wherein the addition of water is performed at a flow rate of 0.1 to 5 ml/min.

7. The method of claim 1, wherein the platinum-loaded template of mesoporous alumina have pores measuring from 2 to 5 nanometers in diameter.

8. The method of claim 1, wherein the platinum catalyst contains about 1.5 to 95 weight parts of platinum for every 100 weight parts of mesoporous carbon supports.

* * * * *